US011202111B2

(12) United States Patent
Hamon

(10) Patent No.: US 11,202,111 B2
(45) Date of Patent: Dec. 14, 2021

(54) METHOD OF READING AND GENERATING A VIDEO STREAM CONTAINING COMPRESSED AND ENCRYPTED IMAGES

(71) Applicant: VIACCESS, Paris la Defense Cedex (FR)

(72) Inventor: Vincent Hamon, Rennes (FR)

(73) Assignee: VIACCESS, Paris la Défense (FR)

( * ) Notice: Subject to any disclaimer, the term of this patent is extended or adjusted under 35 U.S.C. 154(b) by 417 days.

(21) Appl. No.: 16/323,051

(22) PCT Filed: Jul. 28, 2017

(86) PCT No.: PCT/FR2017/052139
§ 371 (c)(1),
(2) Date: Feb. 4, 2019

(87) PCT Pub. No.: WO2018/024972
PCT Pub. Date: Feb. 8, 2018

(65) Prior Publication Data
US 2019/0174160 A1 Jun. 6, 2019

(30) Foreign Application Priority Data
Aug. 5, 2016 (FR) ...................................... 1657613

(51) Int. Cl.
*H04N 13/344* (2018.01)
*H04N 21/2347* (2011.01)
(Continued)

(52) U.S. Cl.
CPC ..... *H04N 21/23476* (2013.01); *H04N 13/344* (2018.05); *H04N 13/383* (2018.05);
(Continued)

(58) Field of Classification Search
CPC .......... H04N 21/23476; H04N 13/383; H04N 13/344; H04N 21/234363;
(Continued)

(56) References Cited

U.S. PATENT DOCUMENTS 7,362,860 B2 * 4/2008 Hayashi ............. H04N 1/00217
283/17
7,457,419 B2 * 11/2008 Hayashi ................... H04K 1/00
380/217
(Continued)

FOREIGN PATENT DOCUMENTS

JP         2014060512      4/2014
WO      WO2008/134014   11/2008

OTHER PUBLICATIONS

Omar et al., "Towards a Format-Agnostic Approach for Production, Delivery and Rendering of Immersive Media," 20130228-20130301, Feb. 28, 2013, pp. 249-260.
(Continued)

*Primary Examiner* — Trang U Tran
(74) *Attorney, Agent, or Firm* — Occhiuti & Rohlicek LLP

(57) ABSTRACT

This method of reading a video stream comprises:
the reception (92) of a video stream which comprises, associated with each tile of an image, a high-quality variant and a degraded variant, this degraded variant being able to be decompressed independently of the degraded variants associated with other tiles which do not have the same coordinates and independently of the high-quality variant associated with the same tile,
for each selected tile, the decryption (118) and the decompression (120) of the high-quality variant associated with this selected tile and, for each unselected tile, the decompression (126) of the degraded variant associated with this unselected tile, and then
(Continued)

LEGEND: GENERATING THE VIDEO STREAM the construction (130) of the degraded version of each portion of the image situated inside an unselected tile on the basis of the degraded variant associated with this unselected tile.

13 Claims, 3 Drawing Sheets

(51) Int. Cl.
    *H04N 21/422*     (2011.01)
    *H04N 21/4728*     (2011.01)
    *H04N 13/383*     (2018.01)
    *H04N 21/2343*     (2011.01)
    *H04N 21/4405*     (2011.01)

(52) U.S. Cl.
    CPC ..... *H04N 21/2343* (2013.01); *H04N 21/2347* (2013.01); *H04N 21/23439* (2013.01); *H04N 21/234327* (2013.01); *H04N 21/234363* (2013.01); *H04N 21/42201* (2013.01); *H04N 21/4405* (2013.01); *H04N 21/4728* (2013.01)

(58) Field of Classification Search
    CPC ......... H04N 21/42201; H04N 21/4728; H04N 21/21; H04N 21/2343; H04N 21/234327; H04N 21/23439; H04N 21/2347; H04N 21/4405
    USPC .......................... 380/239, 14.12; 375/240.24
    See application file for complete search history.

(56) References Cited

U.S. PATENT DOCUMENTS

| | | | | |
|---|---|---|---|---|
| 7,983,497 B2 * | 7/2011 | Kakii | ...................... | H04N 7/144 382/232 |
| 8,081,755 B2 * | 12/2011 | Zhu | .......................... | H04K 1/00 380/217 |
| 8,261,092 B2 * | 9/2012 | Takenaka | ................ | G06F 16/58 713/189 |
| 2005/0237380 A1 | 10/2005 | Kakii | | |
| 2013/0163817 A1 | 6/2013 | Porter et al. | | |
| 2014/0237609 A1 | 8/2014 | Sharp et al. | | |
| 2016/0044346 A1 | 2/2016 | Braness et al. | | |

OTHER PUBLICATIONS

Yeongyun Kim et al., "A Selective Video Encryption for the Region of Interest in Scalable Video Coding," TENCON 2007-2007 IEEE Region 10 Conference, Oct. 1, 2007, pp. 1-4.

Dolan et al., "Information Technology—MPEG Systems Technologies—Part 12: Sample Variants in the ISO Base Media File Format," International Organisation for Standardisation, Strasbourg, France Jul. 16, 2014 (22 pages).

\* cited by examiner

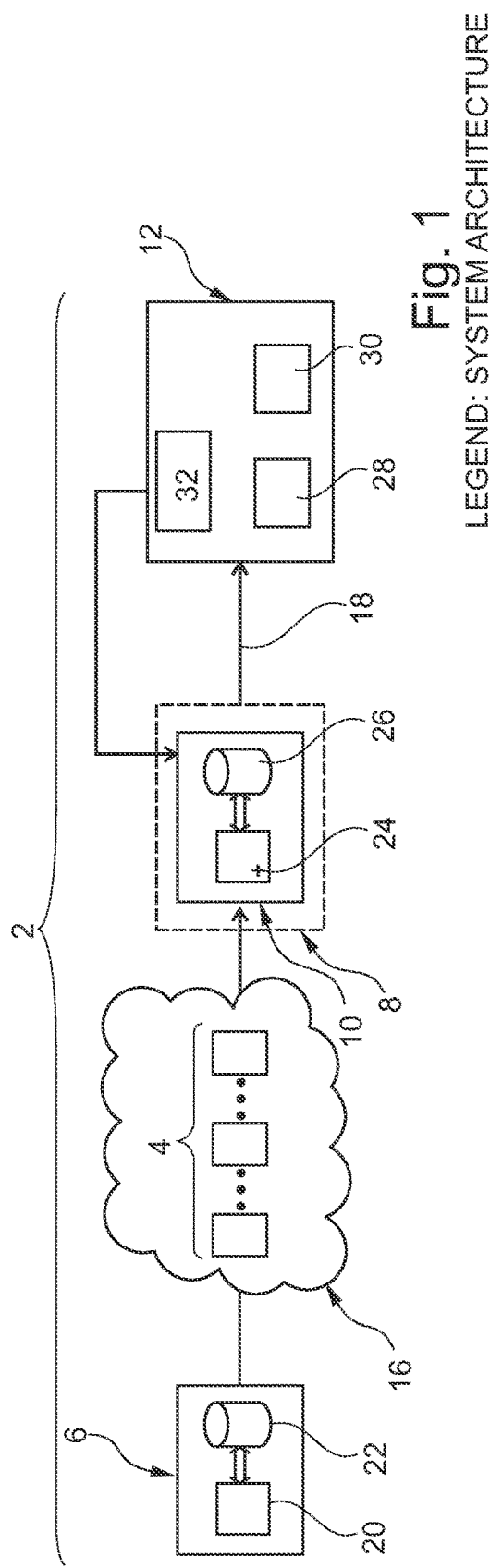
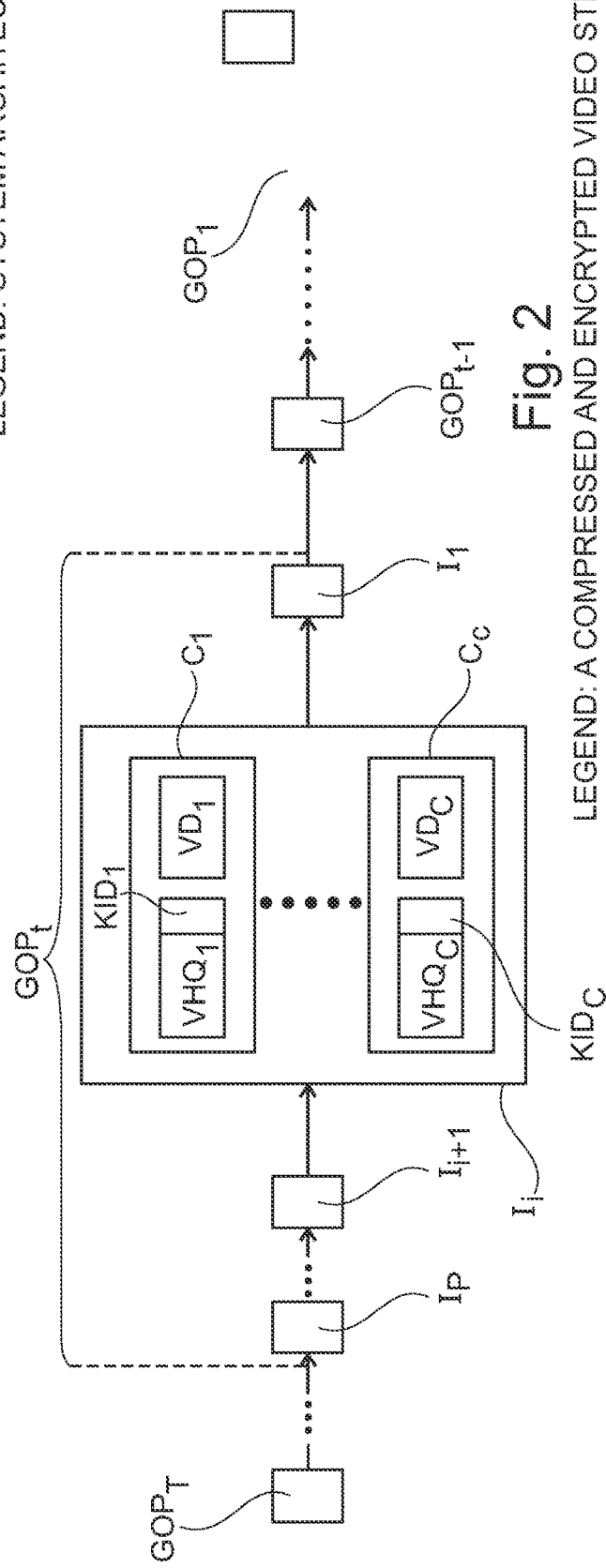

LEGEND: GENERATING THE VIDEO STREAM

LEGEND: READING THE VIDEO STREAM

LEGEND: VIDEO-STREAM READER

LEGEND: IMAGE FROM THE VIDEO STREAM

METHOD OF READING AND GENERATING A VIDEO STREAM CONTAINING COMPRESSED AND ENCRYPTED IMAGES

RELATED APPLICATIONS

This application is the national stage of PCT/FR2017/052139, which was filed on Jul. 28, 2017, which claims the benefit of the Aug. 5, 2016 priority date of French application 1657613, the contents of which are herein incorporated by reference.

BACKGROUND

The invention relates to a method of reading and a reader of a video stream containing compressed and encrypted images. The invention also relates to a method of generation as well as a generator of a video stream containing compressed and encrypted images. Finally, the invention also relates to an information recording medium for the implementation of these methods.

Here, "compression" refers to the operation consisting in reducing the number of bits used to code one and the same item of information. The result of this operation is referred to as compressed item of information. "Decompression" refers to the inverse operation, which makes it possible to obtain, on the basis of the compressed item of information, the item of information in the form that it had before being compressed, and decompressed item of information to its result.

"Encryption" refers to the operation consisting in rendering unintelligible an item of information with the aid of a secret item of information called a "key" in such a way that this item of information can be rendered intelligible again only with the aid of this key, or of another key corresponding to this key. The result of this operation is referred to as encrypted item of information. "Decryption" refers to the inverse operation, which makes it possible to obtain, on the basis of the encrypted item of information, the item of information in the form that it had before being encrypted, and decrypted item of information to its result.

Methods of reading, by an electronic reader, a video stream containing compressed and encrypted images are known. To this effect, the electronic reader comprises: a decryption module which decrypts the video stream to obtain a decrypted video stream, a codec (coder-decoder) which decompresses the decrypted video stream to obtain a decompressed video stream, and a composer that constructs, on the basis of the decompressed video stream, a baseband video stream directly displayable by a screen associated with this reader.

After the decryption module or after the Codec, the video stream is not encrypted. It is therefore vulnerable in relation to an attack that comprises illegally distributing this decrypted video stream to a reader of a third-party that has not legally acquired the rights necessary to display this video stream. To render this type of attack more difficult, various solutions have already been proposed, such as the solutions known by the acronyms PMP ("Protected Media Path") or SVP ("Secure Video Path"). However, these solutions are not fully implemented in all terminals that might have to read and to decrypt such video streams. For example, certain intelligent telephones, better known by the name "smartphones", do not fully implement this solution so that they are vulnerable.

Prior art is also known from: US2005237380A1, JP2014060512A, US2016/044346A1, WO2008/134014A2, US2013/163817A1, and YEONGYUN KIM et Al: "A selective video encryption for the region of interest in scalable video coding", TENCON 2007, IEEE REGION 10 CONFERENCE, Jan. 10, 2007, pages 1-4.

SUMMARY

The invention is therefore aimed at proposing a method of reading a video stream containing compressed and encrypted images which makes it possible to degrade the quality of the video stream which could be distributed illegally without this requiring the implementation of a solution such as the SVP or PMP solution.

Its subject is therefore a method of reading a video stream containing compressed and encrypted images.

By virtue of the claimed reading method, the video stream decrypted by the reader of the terminal contains a high-quality version of the video stream solely in image portions situated in proximity to a point of interest. Conversely, for the image portions that are distant from this point of interest, the items of information making it possible to construct the high-quality version are not decrypted. Thus, these items of information cannot be deduced from the decrypted video stream. Hence, even if this decrypted video stream is illegally distributed to other readers, the users of these other readers cannot benefit from an entirely high-quality video stream. At best, they can benefit from a partially high-quality video stream.

Moreover, the users of these other readers cannot choose the image portions for which a high-quality version is displayed even if they modify the coordinates of the point of interest acquired by their own reader.

Thus, although protection solutions, such as the SVP or PMP solution, are not implemented, the decrypted, and possibly illegally distributed, video stream has a degraded quality which does not make it possible to display an entirely high-quality version of each image of this video stream.

The fact that the degraded version is dependent on the content that the high-quality version, for example since its spatial, colorimetric or temporal resolution is lower, makes it possible to render the implementation of the method still more imperceptible to the user. Moreover, this is obtained without having to decrypt the high-quality variant which codes the high-quality version.

Finally, in the claimed method each decrypted video stream is generated on the basis of the same encrypted video stream received, even if the acquired coordinates of the point of interest are not the same from one terminal to another. This greatly facilitates the generation and the broadcasting of this video stream to numerous terminals.

The various embodiments of the method of reading can exhibit one or more of the following advantages:

The fact that the coordinates of the point of interest are established on the basis of a displacement of the user allows this user himself to simply control the portions of images that he wishes to view in high-quality. Conversely, the other users who would illegally use the same decrypted video stream cannot benefit from this functionality. Thus, these other users do not profit from a viewing comfort equivalent to that of the user who legally acquires this video stream. This therefore limits the interest and the possibilities of distributing such a decrypted video stream to other users.

When the point of interest corresponds to the point toward which the user is directing his gaze, the unselected tiles correspond to the portions of the image that the user is not looking at. This renders the display of a degraded version of the image inside these unselected tiles difficult for the user to perceive. Thus, the user's viewing comfort is hardly disturbed by the implementation of this method.

The fact that the image displayed for the user's right and left eyes is solely composed on the basis of the high-quality versions of the video stream renders the implementation of the claimed method totally imperceptible to the user.

The fact that the images of the video stream extend beyond the angle of vision of a human being makes it possible to render the implementation of the method of reading imperceptible or hardly perceptible to the user.

The subject of the invention is also a method for generating a video stream containing compressed and encrypted images.

The subject of the invention is also an information recording medium comprising instructions for implementing any one of the claimed methods, when these instructions are executed by an electronic microprocessor.

The subject of the invention is also an electronic reader of a video stream containing compressed and encrypted images.

Finally the subject of the invention is also a generator of a video stream containing compressed and encrypted images.

BRIEF DESCRIPTION OF THE DRAWINGS

The invention will be better understood on reading the description which follows, given solely by way of nonlimiting example and while referring to the drawings in which:

FIG. 1 is a schematic illustration of the architecture of a system for generating and reading a compressed and encrypted video stream;

FIG. 2 is a schematic and partial illustration of the structure of the compressed and encrypted video stream;

In these figures, the same references are used to refer to the same elements. Hereinafter in this description, the characteristics and functions well known to the person skilled in the art are not described in detail.

DETAILED DESCRIPTION

Figure 3:
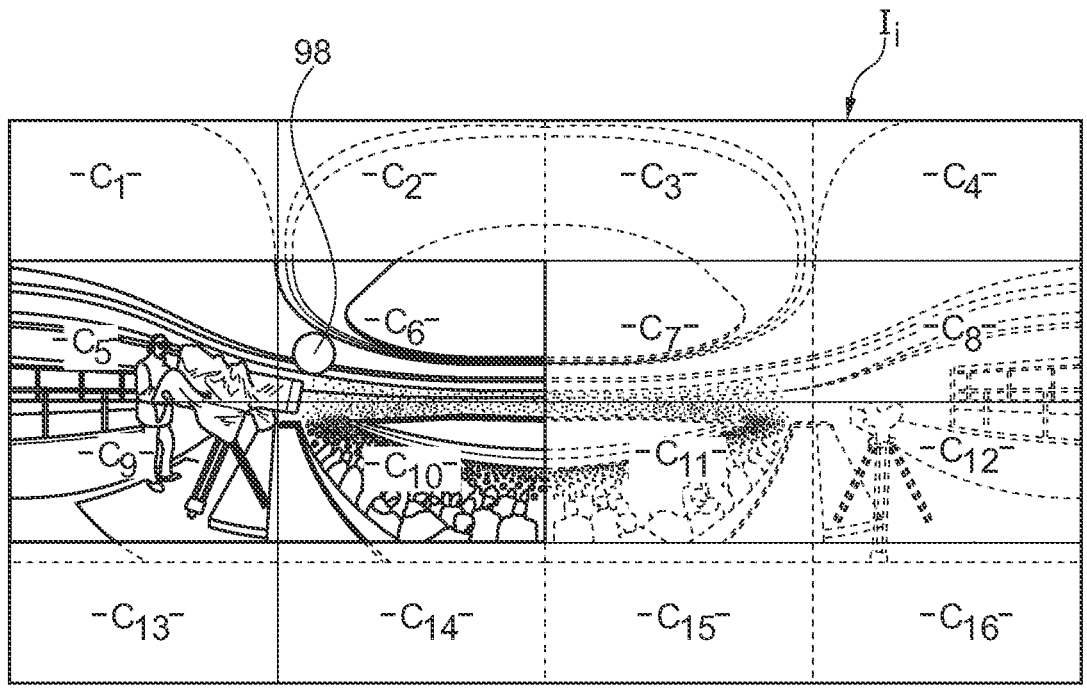
FIG. 3 is a schematic illustration of an image of the video stream.

FIG. 1 represents a system 2 for generating and reading a video stream 4 compressed and encrypted tile-wise. The system 2 comprises: a generator 6 of the video stream 4, a terminal 8 equipped with a reader 10 of the video stream 4, and a device 12 for displaying the video stream 4 read by the reader 10.

The video stream 4 codes a temporal and ordered succession of images intended to be displayed one after the other on a screen at a given frequency called here the "refresh frequency". In this embodiment, the video stream 4 is an immersive video. Thus, typically, the video stream 4 is intended to be displayed by a virtual-reality display device.

The video stream 4 is therefore a video in which each image simultaneously contains views of what surrounds the camera in several different directions. For example, each image contains views taken in all the directions contained inside a cone of vision whose vertex coincides with the objective of the camera. Generally, the angle α at the vertex of this cone of vision is greater than the angle of vision of a human being who was situated at the same location as the camera. Because of this, each image of the video stream comprises more views than can be perceived, in one go, by a stationary human being situated at the location of the camera. Typically, the angle α is therefore strictly greater than 70° or 80° and, generally, greater than 100° or 180° or 260°. In the case where the cone of vision does not have a circular base, that is to say that it is not a cone of revolution, the angle α is defined as being equal to the vertex angle of the smallest cone of revolution which entirely contains this cone of vision. Smallest cone of revolution refers to the cone of revolution which has the smallest vertex angle.

When the angle α is equal to 180°, the image is often called "hemispherical image". The angle α can also be equal to 360°. In this case, each image contains the views taken in all directions in space. One then often speaks of 360° images or of omnidirectional images.

The camera used to film and record an immersive video comprises for example several objectives simultaneously pointing in different directions and/or objectives with very large aperture angles, that is to say objectives whose aperture angle is greater than 100° or 160° or 180°.

The generator 6 is hooked up to the terminal 8, for example, by way of an information transmission network 16 such as the Internet network. The generator 6 can be a broadcasting network head or a server for videos.

The generator 6 comprises a programmable electronic microprocessor 20 hooked up to a memory 22. The microprocessor 20 is capable of executing the instructions recorded in the memory 22. Here, the memory 22 comprises the instructions necessary for implementing the method of FIG. 5.

The terminal 8 controls the device 12 so as to display the video stream that it reads. In this embodiment, the device 12 is considered to be an element outside the terminal 8.

The reader 10 decrypts and decompresses the video stream 4 so as to obtain a baseband video stream 18.

Typically, a baseband video stream consists mainly of blocks of successive bits which each code the color of a respective pixel. It is the position of the block of bits inside the video stream 18 which codes the position of the corresponding pixel. For example, the video stream 18 complies with the HDMI ("High Definition Multimedia Interface") format or similar. If necessary, the video stream 18 can be encrypted in accordance with the HDCP ("High-Bandwidth Digital Content Protection") standard. The link between the reader 10 and the device 12 is a short-distance link, that is to say a distance of generally less than 30 m or 20 m or 10 m. Hereinafter, the video stream 18 is termed plaintext since it no longer needs to be decrypted by the reader 10 in order to be able to be displayed, in an intelligible manner, by the device 12.

The reader 10 comprises a programmable electronic microprocessor 24 hooked up to a memory 26. The microprocessor 24 is capable of executing the instructions recorded in the memory 26. Here, the memory 26 comprises the instructions necessary for the implementation of the method of FIG. 6.

The device 12 is here an HDM ("Head Mounted Display") headset or any other virtual-reality headset making it possible to obtain stereoscopic vision. To this effect, the device 12 comprises in particular two screens 28 and 30 placed, respectively, facing the right and left eyes of the user. The device 12 also comprises a set 32 of sensors capable of measuring one or more physical quantities representative of the direction in which the user's gaze is pointing. For example, the set 32 comprises sensors which measure the displacement of the user's head and/or of the user's pupils. The set 32 is hooked up to the reader 10.

Hereinafter, the embodiment of the system 2 is described in the particular case where: the video stream 4 is coded in compliance with the H.265 standard, also known by the term HEVC ("High Efficiency Video Coding"), the transport layer complies with the ISOBMFF ("ISO Base Media File Format") standard, and the encryption/decryption of the video stream complies with the CENC ("Common Encryption Scheme") standard.

For more information on the H.265 standard, the reader can refer to the documents ISO/CEI 23008-2 and UIT-H.265 published in April 2015 or their later versions. For more information on the ISOBMFF standard, the reader can refer to the document ISO/CEI 14496-12 published in December 2015. For more information on the CENC standard, the reader can refer to the document ISO/CEI 23001-7 second edition or their later versions.

These standards being known to the person skilled in the art, the operating principles and the various possibilities of implementation that these standards offer are not described here in detail. Only the particular way of using and of implementing these standards to generate and read the video stream 4 is described here. The terminology used in this description is the same as that defined in these standards.

FIG. 2 represents a schematic illustration of the organization of the video stream 4 compressed and encrypted tile-wise.

The video stream 4 consists of a temporal succession of groups of bits each coding a smaller closed group of images. A closed group of images is known by the English term "closed group of pictures". A group of images is said to be closed when it is a group of images that can be decompressed independently of the other groups of images. A closed group of images is said to be a smallest closed group of images when it does not contain any another closed group of images. Hereinafter, unless indicated to the contrary, each smallest closed group of images of the video stream 4 is simply called a "group of images".

Typically, these groups of images are placed in the video stream 4 in the order in which these groups of images must be displayed on the screens 28 and 30 when they are read by the reader 10.

In FIG. 2, only the first group of images $GOP_1$, the last group of images $GOP_T$ and an intermediate group of images $GOP_t$ have been represented. The number T of groups of images may be large and depends on the duration of the video. For example, the number T may be greater than 1000, 10000 or 100000.

In FIG. 2 et seq., the dots indicate that a part of the illustration has been omitted so as to simplify it.

The groups of images have similar or identical structures and only the structure of the group of images $GOP_t$ is described and represented in greater detail.

The group GOP comprises P images $I_1$ to $I_P$. The number P is generally small, that is to say less than fifteen or ten. It may also be equal to one.

The ISOBMFF standard provides for the possibility of cutting a "sample" into several ranges of information bits called "variant bit range group" and of associating each of these ranges with one or more variants called "variant bit range". In the embodiment described here, an image $I_i$ corresponds to what is called "sample" in the ISOBMFF standard. Moreover, the possibility offered by this standard is utilized to divide each image $I_1$ to $I_P$ into a number $N_c$ of ranges of bits and to associate each of these ranges with two variants called, respectively, "high-quality variant" and "degraded variant". This organization of the bits coding each image is the same for each image. Thus, it is described in greater detail only for the image L.

For each image $I_i$, a paving of its total surface with $N_c$ contiguous tiles $C_1$ to $C_c$ has been previously defined before the compression and the encryption of the video stream 4. The number $N_c$ is greater than or equal to two or three and, preferably, greater than or equal to four or eight or sixteen. Generally, the number $N_c$ is less than or equal to $2^8$ or $2^{10}$. The number $N_c$ is chosen in such a way that the portion of the image $I_i$ situated inside a tile $C_j$ contains at least 1000 pixels or 10000 pixels of the image. Here, the number $N_c$ is chosen equal to sixteen.

In this embodiment, each tile $C_j$ is a rectangle or a square. Moreover, all the tiles $C_j$ have the same dimensions. Hence, these tiles $C_1$ to $C_c$ are distinguished from one another only by their coordinates in the plane of the image $I_i$.

FIG. 3 represents the sixteen tiles $C_1$ to $C_{16}$ of the image $I_i$.

During the generation of the video stream 4, with each tile $C_j$ of the image $I_i$ are associated two variants $VHQ_j$ and $VD_j$. The variants associated with the tile $C_j$ are ranges of bits of the video stream 4 which each code a respective version for that content of the image $I_i$ which is situated inside the tile $C_j$. More precisely, the variants $VHQ_j$ and $VD_j$ code, respectively, so-called "high-quality" and "degraded" versions of that content of the image $I_i$ which is situated inside this tile $C_j$. When it is displayed on the screen 28 or 30, the degraded version presents less information to the user than the high-quality version of the same portion of the image $I_i$, when it is the latter that is displayed. To this effect, for example, the spatial resolution of the high-quality version is higher than that of the degraded version. "Spatial resolution of the image" refers to the number of pixels per unit area of the image. Here, the variant $VHQ_j$ codes the same content as the variant $VD_j$ but with a higher spatial resolution. For example, its spatial resolution is two or four or sixteen times higher. Preferably, the spatial resolution of the variant $VHQ_j$ is greater than or equal to the spatial resolution of the screens 28 and 30. The spatial resolution of a screen is the maximum number of pixels per unit area that this screen is capable of displaying. Conversely, the spatial resolution of the variant $VD_j$ is strictly less than the spatial resolution of the screens 28 and 30. Thus, when the variant $VD_j$ is used to construct the portion of the image $I_i$ situated inside the tile $C_j$, the colors of certain pixels must be deduced by interpolation on the basis of the colors of the neighboring pixels, thereby degrading the quality of the image displayed inside the tile $C_j$.

For example, the high-quality version is a high-definition version of the image, while the degraded version is a low-definition version of this same image.

In the video stream 4, each variant $VHQ_j$ of the group of images $GOP_t$ is compressed without taking account of the variants $VHQ_{k\ne j}$ associated with other tiles $C_{k\ne j}$ whose coordinates are different. Moreover, in this embodiment, the variant $VHQ_j$ is compressed without taking account of the degraded variants and, in particular, without taking account of the variants $VD_1$ to $VD_C$. Finally, each variant $VHQ_j$ of the group of images $GOP_t$ is compressed without taking account of the variants $VHQ_j$ of the images of another image group. Hereinafter, the variant $VHQ_j$ obtained after this compression operation is called "compressed variant $VHQ_j$".

By virtue of this, it is possible to decompress the variant $VHQ_j$ without it being necessary to also decompress the variants $VHQ_{k\neq j}$ associated with tiles different from the tile $C_j$ and without it being necessary to decompress the degraded variants.

Optionally, the variant $VHQ_j$ is compressed by taking into account the other variants $VHQ_j$ of the images $I_1$ to $I_P$ associated with the same tile $C_j$. This makes it possible to increase the compression ratio since the information which is redundant between the different variants $VHQ_j$ of the different images $I_1$ to $I_P$ can then be eliminated. On the other hand, it may then be necessary to decompress all the variants $VHQ_j$ of the images $I_1$ to $I_P$ before being able to access the content of the variant $VHQ_j$ of the image $I_i$. This may therefore delay the decompression of a variant $VHQ_j$ during reading. However, as long as this delay remains short, that is to say typically less than 100 ms or 20 ms, the latter remains difficult for the user to perceive.

Each degraded variant $VD_j$ of the group of images $GOP_t$ is compressed in a similar manner to what has just been described for the variants $VHQ_j$. Thus, like the variants $VHQ_j$, the degraded variant $VD_j$ can be decompressed independently of the degraded variants $VD_{k\neq j}$ associated with the tiles $C_{k\neq j}$ different from the tile $C_j$ and independently of the high-quality variants. Hereinafter, the variant $VD_j$ obtained after this compression operation is called "compressed variant $VD_j$".

The possibility of compressing and decompressing a video stream piecewise is provided for in the H.265 standard. Here, this possibility is utilized to generate the video stream 4.

In the video stream 4, the block of bits containing the compressed variants $VHQ_j$ for the images $I_1$ to $I_P$ is also encrypted with the aid of a secret key $KHQ_j$ to obtain compressed and encrypted variants $VHQ_j$. Typically, the key $KHQ_j$ is different for each tile $C_j$. This block of bits is encrypted independently, that is to say without taking into account, the blocks of bits containing other compressed high-quality variants $VHQ_{k\neq j}$ associated with tiles $C_{k\neq j}$ different from the tile $C_j$. Moreover, here, this block of bits is also encrypted independently of the blocks of bits which contain the compressed variants $VHQ_j$ of other groups of images. By virtue of this, the compressed and encrypted variants $VHQ_j$ of the images $I_1$ to $I_P$ can be decrypted independently of the compressed and encrypted high-quality variants associated with the tiles $C_{k\neq j}$ different from the tile $C_j$. This possibility of piecewise encryption of a video stream is provided for in the CENC standard. On the other hand this standard does not indicate and does not suggest that this possibility can be implemented to encrypt different variants of a video stream independently of one another.

In a similar manner, the block of bits containing the compressed variants $VD_j$ of the images $I_1$ to $I_P$ is encrypted independently of the blocks of bits containing the degraded variants $VD_{k\neq j}$ associated with tiles $C_{k\neq j}$ different from the tile $C_j$. The compressed variants $VD_j$ are also encrypted independently of the compressed high-quality variants. Thus, the compressed and encrypted variants $VD_j$ can be decrypted independently of the degraded variants $VD_{k\neq j}$ and of the high-quality variants of the video stream 4.

The block of bits containing the compressed variants $VD_j$ of the images $I_1$ to $I_P$ is encrypted with the aid of a secret key $K_D$. This encrypted block of bits is called hereinafter "compressed and encrypted variants $VD_j$". The key $K_D$ is different from all the keys $KHQ_j$. For example, the key $K_D$ is the same for all the tiles $C_j$ of the image.

For each image and each tile $C_j$, the video stream 4 contains only the compressed and encrypted variants $VHQ_j$ and $VD_j$. Thus, the variants $VHQ_j$ can only be decrypted by a reader 10 having acquired the key $KHQ_j$ beforehand and the variant $VD_j$ can only be decrypted by a reader 10 having acquired the key $K_D$ beforehand.

Finally, each variant $VHQ_j$ is associated in the video stream 4 with an identifier $KID_j$ which allows a DRM agent of the reader 10 to identify or to construct the key $KHQ_j$ to be used to decrypt this compressed and encrypted variant $VHQ_j$.

In this embodiment, given that the key $K_D$ is the same for all the tiles $C_j$, it is not necessary to associate an identifier of the key $K_D$ with each compressed and encrypted variant $VD_j$.

Figure 4:
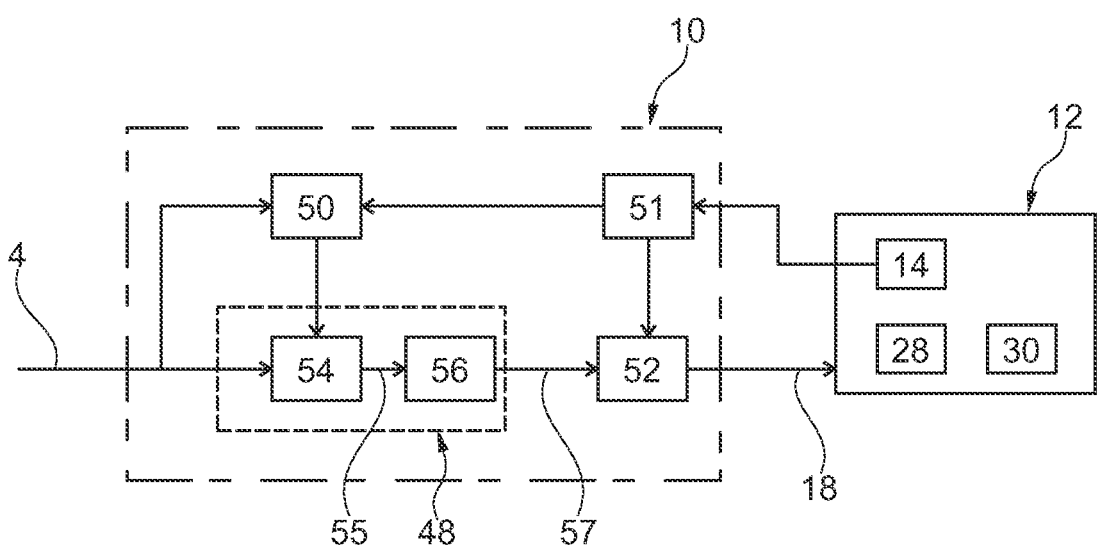
FIG. 4 is a schematic illustration of the architecture of a reader of the video stream of FIG. 2.

FIG. 4 represents the architecture of the reader 10 in greater detail. The various components of the reader 10 represented in this figure can each be implemented either in software form or in hardware form. The reader 10 comprises: a module 48 for decrypting and decompressing the video stream 4, a DRM agent 50 able to acquire, verify, manage and store secret information such as the keys $KHQ_j$ and $K_D$, a positioner 51 which establishes the coordinates of a point of interest as a function of the measurements of the sensors of the set 32, and a composer 52 responsible for constructing the video stream 18 as a function of the coordinates established by the positioner 51.

The module 48 comprises: a decryption sub-module 54 which decrypts the video stream 4 so as to obtain a decrypted video stream 55 and a codec 56 (coder-decoder) which decodes the video stream 55 so as to obtain a plaintext video stream 57, that is to say a video stream in which the images are at one and the same time decrypted and decompressed.

The customary manner of operation of the various components of the reader 10 is known and described in the standards cited hereinabove. Thus, hereinafter, only the manner of operation of these components specific to the reading of the video stream 4 is described in detail. Here, this manner of operation is described with reference to FIG. 6.

Figure 5:
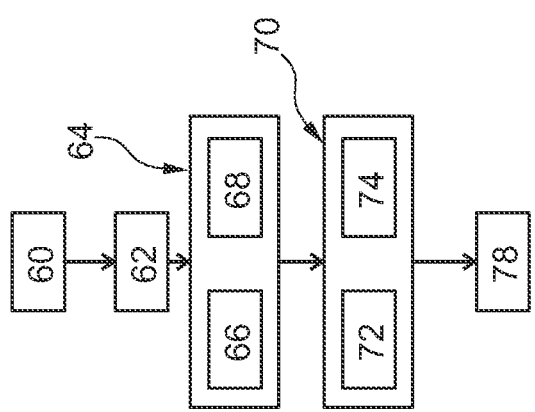
FIG. 5 is a flowchart of a method for generating the video stream of FIG. 2.

The manner of operation of the generator 6 is now described with reference to the method of FIG. 5.

During a step 60, the generator 6 acquires the coordinates of the tiles $C_j$ which, when they are joined together, form a paving of the totality of the surface of the images to be compressed and encrypted. Typically, the coordinates of these tiles are defined with respect to a fixed frame of the plane of the image. For example, the coordinates of the tiles $C_j$ are acquired on the basis of a prerecorded table which contains for each image format, the coordinates of the tiles to be used.

During a step 62, the generator 6 receives the video stream to be compressed and encrypted. For example, accordingly, the generator 6 is hooked up to a camera or to an information recording medium on which the video stream is recorded. At this instant, the video stream received contains on its own all the information necessary to be displayed on a screen in a manner intelligible to a human being. In particular, to obtain this display, it is not necessary to combine the plaintext images with a secret item of information such as a decryption key. This video stream received comprises at one and the same time the high-quality and degraded versions of each portion of each image.

During this step, for each tile $C_j$ whose coordinates have been acquired during step 60 and for each image of the video stream received, the generator 6 acquires the plaintext variants $VHQ_j$ and $VD_j$.

During a step 64, the generator 6 cuts the video stream into groups of images.

Thereafter, for each group of images and each tile $C_j$, it executes the following operations: an operation 66 of compression of the variants $VHQ_j$ of the images $I_1$ to $I_P$ to obtain the compressed variants $VHQ_j$ described with reference to FIG. 2 and an operation 68 of compression of the variants $VD_j$ of the images $I_1$ to $I_P$ to obtain the compressed variants $VD_j$ described with reference to FIG. 2.

Thereafter, during a step 70, for each tile $C_j$, the generator 6 executes the following operations: an operation 72 of encryption with the key $KHQ_j$ of the compressed variants $VHQ_j$ to obtain the compressed and encrypted variants $VHQ_j$ described with reference to FIG. 2 and an operation 74 of encryption with the key $K_D$ of the compressed variants $VD_j$ to obtain the compressed and encrypted variants $VD_j$ described with reference to FIG. 2.

Finally, during a step 78, the compressed and encrypted variants $VHQ_j$ and the compressed and encrypted variants $VD_j$ are assembled together to form the video stream 4. During this step, the generator associates, in the video stream generated, each of the compressed and encrypted variants $VHQ_j$ and each of the compressed and encrypted variants $VD_j$ with the corresponding "variant bit range group", that is to say with the corresponding tile $C_j$.

On completion of this step 78, the video stream 4 is either transmitted in tandem with its generation to the terminal 8 through the network 16 or recorded in a file in the memory 22. The first mode of transmission corresponds to a transmission known by the English term "streaming", that is to say that the transmission of the video stream 4 starts before all the variants of this video stream have been compressed and encrypted. Conversely, the second mode of transmission corresponds to a transmission known by the term "downloading" in which the transmission of the file to the terminal 8 can only begin after all the images of the video stream have been acquired, compressed, and encrypted.

Figure 6:
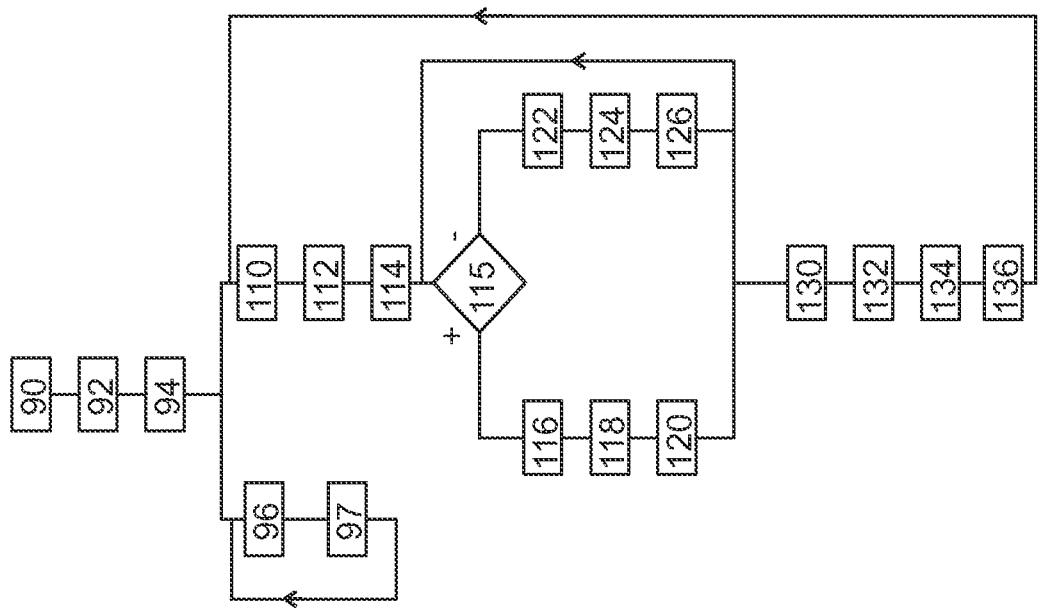
FIG. 6 is a flowchart of a method of reading the video stream of FIG. 2.

The manner of operation of the reader 10 will now be described with reference to the method of FIG. 6.

Initially, during a step 90, the DRM agent 50 acquires the various keys $KHQ_j$ and the key $K_D$ which are necessary to decrypt at one and the same time the compressed and encrypted variants $VHQ_j$ and the compressed and encrypted variants $VD_j$.

During a step 92, the reader 10 receives the video stream 4 transmitted by "streaming" or downloaded through the network 16.

During an operation 94, before the start of the reading of the video stream 4, the reader acquires the coordinates of all the tiles $C_j$ used during the generation of the video stream 4. For example, this item of information is communicated to it by the generator 6 through the network 16. Hereinafter, it is assumed that the division of each image into tiles is the same from the start to the end of the video.

During a step 96, throughout the duration of the reading of the video stream 4, the sensors of the set 32 measure one or more physical quantities representative of the direction in which the user is looking and transmits these measurements to the reader 10, and more precisely to the positioner 51.

In response, during a step 97, the positioner 51 acquires these measurements and establishes the coordinates, in the plane of the images, of a point toward which the user is pointing his gaze. This point is called "point of interest" and bears the reference 98 in FIG. 3. Accordingly, its coordinates are established on the basis of the measurements acquired and, for example, of the known position of the user's eyes with respect to the screens 28 and 30.

Throughout the duration of the reading of the video stream 4, steps 96 and 97 are repeated in a loop. For example, these steps are repeated with a frequency greater than the frequency of display on the screens 28 and 30 of the images or of the groups of images of the video stream 4. Thus, the positioner 51 permanently provides up-to-date coordinates of the point 98.

In parallel, during a step 110, before the reading of each group of images, the DRM agent 50 acquires the coordinates of the point of interest established by the positioner 51.

Thereafter, during a step 112, the DRM agent 50 selects the tile or tiles closest to the coordinates of the point 98. For example, the DRM agent 50 calculates the distance between the point 98 and the center of each of the tiles $C_j$ and selects just the four tiles corresponding, respectively, to the four smallest calculated distances.

In the case of FIG. 3, this leads to selecting the four tiles $C_5$, $C_6$, $C_9$ and $C_{10}$. The other tiles which are not selected during this step 112 are called "unselected tiles". In the case of FIG. 3, the unselected tiles are the tiles $C_1$ to $C_4$, $C_7$ to $C_8$, and $C_{11}$ $C_{16}$.

During a step 114, for each tile $C_j$, the DRM agent 50 reads the identifier $KID_j$ associated with the compressed and encrypted variant $VHQ_j$ in the video stream 4.

Next, during a step 115, for each tile $C_j$, the DRM agent 50 verifies whether the following two conditions are fulfilled simultaneously: the tile $C_j$ is a tile which has been selected during step 112, and the key $KHQ_j$ corresponding to the identifier $KID_j$ is one of the keys acquired during step 90.

In the affirmative, during a step 116, the DRM agent 50 provides the key $KHQ_j$ to the decryption sub-module 54.

In response, during a step 118, the sub-module 54 decrypts, with the aid of the key $KHQ_j$ provided, the compressed and encrypted variants $VHQ_j$ associated with the tile $C_j$ in the images $I_1$ to $I_P$ to obtain the compressed and decrypted variants $VHQ_j$ for each of these images $I_1$ to $I_P$.

Thereafter, during a step 120, the codec 56 decompresses the compressed variants $VHQ_j$ obtained on completion of step 118. The codec 56 then obtains the decompressed and decrypted variants $VHQ_j$ for the images $I_1$ to $I_P$.

If during step 115, the tile $C_j$ is not a tile selected during step 112 or if the DRM agent 50 cannot obtain the key $KHQ_j$ corresponding to the identifier $KID_j$, then the method continues via a step 122.

During step 122, the DRM agent 50 provides only the key $K_D$ to the decryption sub-module 54 and not the key $KHQ_j$. Because of this, the compressed and encrypted variants $VHQ_j$ of the images $I_1$ to $I_P$ cannot be decrypted.

In response, during a step 124, the sub-module 54 decrypts the compressed and encrypted variants $VD_j$ associated with the tile $C_j$ for the images $I_1$ to $I_P$ so as to obtain the compressed and decrypted variants $VD_j$ for each of these images $I_1$ to $I_P$.

Thereafter, during a step 126, the codec 56 decompresses the compressed variants $VD_j$ obtained on completion of step 124. The codec 56 thus obtains the decompressed and decrypted variants $VD_j$ for the images $I_1$ to $I_P$.

Steps 114 to 126 are repeated for each tile $C_j$ of the images of the group of images.

Thereafter, during a step 130, the reader 10 constructs the image portion contained inside each tile $C_j$ on the basis of the variant decompressed and decrypted for this tile $C_j$ during the execution of steps 114 to 126. Thus, during this step, if the variant $VHQ_j$ associated with this tile $C_j$ has been decompressed and decrypted, the reader 10 constructs the high-quality version of the portion of the image situated inside this tile $C_j$. In the converse case, that is to say if only the variant $VD_j$ associated with this tile $C_j$ has been decompressed and decrypted during steps 114 to 126, then the reader 10 constructs only the degraded version of the image portion situated inside this tile $C_j$.

Thereafter, during a step 132, the reader 10 assembles the high-quality and low-quality versions so as to form the decompressed and decrypted images which form the video stream 57 transmitted to the composer 52.

During a step 134, the composer 52 composes the video stream 18 on the basis of the video stream 57. More precisely, in this embodiment, for each image of the video stream 57, it composes two image fractions, on the basis of each image of the video stream 57, respectively for the right and left eyes of the user. To this effect, it uses the coordinates of the point 98 which are transmitted to it by the positioner 51 and the known position as well as the known dimensions of the screens 28 and 30. Typically, these two image fractions are each four or ten times smaller than the complete image $I_i$ contained in the video stream 57. Moreover, these image fractions are centered on the point 98. Under these conditions, the composer 52 uses only the high-quality versions of the decompressed and decrypted image to construct the two image fractions. Thus, in this embodiment, the degraded versions of the portions of the image are not contained in the video stream 18.

Finally, during a step 136, the composer 52 transmits, by way of the video stream 18, the composed image fractions and the device 12 displays them on the screens 28 and 30.

It will be noted that in the method described, the variants $VHQ_j$ which make it possible to construct the high-quality versions of the portions of the image which are situated inside the unselected tiles are never decrypted. Thus, the video stream 55 or 57 or 18 does not make it possible to construct a high-quality version for all the portions of the image.

Moreover, it is difficult for a user other than the user of the terminal 8 to use the video stream 55 or the video stream 57. Indeed, the direction in which this other user is looking will be different, at least occasionally, from the direction in which the user of the device 12 is looking. Hence, the images displayed by this other user's display device for the direction in which he is looking are not always high-quality. This decreases this other user's viewing comfort and renders the illicit distribution of the video stream 55 or 57 to other users hardly beneficial. Finally, this result is obtained without it perceptibly degrading the quality of the images perceived by the legal user of the terminal 8, or hardly degrading it.

Variants of the Point of Interest:

Other procedures for establishing the coordinates of the point of interest are possible. For example, the coordinates of the point of interest can be determined on the basis of the acquisition of a voice command by the terminal. For example, when the terminal acquires the voice command "Look behind", the current position of the point of interest is displaced horizontally by 180° so that the high-quality versions of the portions situated behind the user are now the ones which are decrypted and displayed.

Generally, from the moment at which there exists a sensor which measures a displacement of an arbitrary part of the user's body, such as the user's pupils, the measurements of this sensor can be used, alone or in combination with the measurements of another sensor, to determine the coordinates of the point of interest. For example, the user moves a joystick by displacing it with his hand and the coordinates of the point of interest are modified as a function of the measurements of the displacement of this joystick. Thus, in this variant, the coordinates of the point of interest are dependent on the displacement of the user's hand. The joystick can be replaced with a hand-held apparatus directly displaceable by the user and equipped with an inertial platform which measures the displacements in space of this apparatus. For example, this apparatus is a smartphone or a tablet. In the latter case, the screen on which the image is displayed can be that of this smartphone or of this tablet.

The coordinates of the point of interest can also be obtained as a function of the displacement of other users watching the same video at the same time or having already watched this video. In this case, these measurements are for example obtained by way of the network 16 and transmitted to the positioner 51. Such measurements are for example used to predict the position of the point toward which the user will point his gaze.

In other embodiments, the coordinates of the point of interest can also be established independently of the measurements of a displacement of the user. For example, in the case of a video of a football match, a software module automatically extracts the coordinates of the ball in the image. This software module can be executed by the generator 6. The extracted coordinates are thereafter transmitted and used by the positioner 51 to establish the coordinates of the point of interest. For example, the coordinates of the point of interest are equal to these extracted coordinates.

In another variant, for each image, the positioner establishes not the coordinates of a single point but the coordinates of several points of interest. Thus, the high-quality versions of the image are constructed for all the portions of the image situated around one of these points of interest. The simultaneous use of several points of interest may turn out to be useful when the amplitude of the displacement of the point of interest is significant for a time interval corresponding to that of a group of images. In this case, it may be useful to predict the trajectory of the point of interest for this time interval. Thereafter, the coordinates of several points of interest situated along the predicted trajectory are established so as to decrypt the variants $VHQ_j$ associated with all the tiles situated along this trajectory.

Variants of the High-Quality and Degraded Versions:

The tiles are not necessarily square or rectangular. Other shapes are possible. For example, the tiles can be triangular or hexagonal or any other shapes on the basis of which it is possible to pave the entire area of the image without leaving any space between these tiles. It is also possible to use a paving in which the tiles do not all have the same dimensions. For example, the tiles are smaller at the center of the image and larger its periphery.

The paving of the images of a video is not necessarily constant throughout the duration of the video. For example, the number of tiles $N_c$ may be modified from one image to the other or from one group of images to the other. Likewise, it is possible to modify the shape of the tiles or the paving used from one image to the other or from one group of images to the other.

The degraded version can be obtained in various ways. For example, it can be obtained by decreasing the temporal or colorimetric resolution of the high-quality version. Decreasing the colorimetric resolution consists in limiting the depth, that is to say the total number of different colors that can be coded. For example, in the high-quality version, the colors are coded on 32 bits while in the degraded version the colors are coded on only 16 bits. Decreasing the temporal resolution consists in decreasing the frequency of refreshing of a portion of the image. For example, if the refresh frequency of the high-quality versions is denoted $f_{HQ}$, then the refresh frequency $f_D$ of the portions of the image inside the unselected tiles is strictly less than this frequency $f_{HQ}$. For example, in one image out of two, the degraded variant is identical to the high-quality variant. In the other images, the degraded variant is identical to the degraded variant of the immediately preceding image. Under these conditions, the high-quality version is refreshed at the frequency $f_{HQ}$ while the degraded version is refreshed at the frequency $f_D=f_{HQ}/2$.

It is also possible to combine one or more of the following modifications to obtain the degraded variant: a decrease in the spatial resolution, a decrease in the colorimetric resolution and a decrease in the temporal resolution.

The degraded variant can also be obtained by modifications other than a decrease in the spatial, colorimetric or temporal resolution. For example, a degraded version of a portion of the image situated inside a tile is obtained by averaging the colors of the pixels of the high-quality versions of the image which are situated inside the tiles which touches this tile. In this case, the degraded variant varies as a function of the content of the high-quality variants. However, the degraded version of a portion of the image always contains less information than the high-quality version displayable inside the same tile.

In another alternative, the degraded version to be displayed inside each tiles $C_j$ is constructed directly on the basis of the content of the encrypted variant $VD_j$ without decrypting this variant. In this case, the decrypted and decompressed image contained in the video stream 57 comprises at one and the same time decrypted and decompressed portions situated inside the selected tiles and non-decrypted portions situated inside the unselected tiles. In this alternative, it is not necessary to decrypt the variants $VD_j$ associated with each unselected tile.

In another embodiment, the degraded version is omitted. For example, it is possible if the content of the degraded version is not dependent on the content of the video stream and, in particular, on the content of the high-quality versions. In this case, it is the reader 10 which constructs the degraded version of the image portions by using information prerecorded in its memory 26. For example, the degraded version is a constant image portion which does not vary over time. This constant image portion is, for example, a uniform color. In this case, the degraded version may have the same spatial, colorimetric and temporal resolution as the high-quality version. However, the degraded version is distinguished from the high-quality version by the fact that it does not contain any information which would make it possible to reconstruct the high-quality version.

The various ways described here of obtaining a degraded version coded by the degraded variant can be combined together.

In another embodiment, to save bandwidth, the high-quality variant contains only the items of information which, when they are combined with the items of information contained in the degraded variant, make it possible to construct the high-quality version of the image portion. Typically, these items of information are called "enhancement". Accordingly, the generator 6 implements a tile-based encoding and, in addition, a hierarchical encoding. The hierarchical encoding is also known by the term "scalable video coding". Such a possibility is provided for and available in the generators complying with the H.265 standard. In the H.265 standard, this is known by the acronym SHVC ("Scalable High efficiency Video Coding"). Thus, the generator 6 generates a base stream and an enhancement stream for each tile of each image. The degraded variants contain the base stream and the high-quality variants contain the enhancement stream. In this case, in contradistinction to the previous embodiment, to obtain the high-quality version of an image portion, the sub-module 54 decrypts at one and the same time the degraded variant and the high-quality variant which are associated with the selected tiles so as to obtain at one and the same time the base stream and the enhancement stream. For the image portions situated inside unselected tiles, only the degraded variant is decrypted.

It is also possible to implement the tile-based compression and encryption solely for the high-quality variants but not for the degraded variants. In this case, the degraded version of the images is not divided into tiles but compressed and encrypted as a single piece. Conversely, the high-quality version of the images is divided into tiles. Each of these tiles is associated with a respective high-quality variant. Here, preferably, each high-quality variant is an enhancement which makes it possible to transform the degraded version of the same portion of the image into a high-quality version. In this case, the degraded image is firstly decrypted and then decompressed to obtain a degraded version of the totality of the image to be displayed and therefore of each of the portions of this image. Thereafter, as a function of the position of the point of interest, certain high-quality variants are decrypted and decompressed to obtain the enhancements which make it possible for certain portions of the degraded image to be switched to a high-quality version.

As a variant, the high-quality variant $VHQ_j$ is compressed by taking into account the content of the variant $VD_j$. This makes it possible to raise the compression ratio since the redundancies between the variants $VHQ_j$ and $VD_j$ can be eliminated. On the other hand, during the decompression of the video stream 4, to decompress the variant $VHQ_j$, the reader 10 must decrypt and decompress the variant $VD_j$ beforehand. The fact that the variant $VD_j$ is decrypted and decompressed, in addition to the variant $VHQ_j$, is not detrimental to the security of the method since this variant $VD_j$ corresponds to the degraded version of the image.

The number $N_V$ of variants associated with a tile of the image is not limited to a high-quality variant and a degraded variant. The number $N_V$ may be greater than or equal to three. For example, in addition to the variants $VHQ_j$ and $VD_j$, a medium-quality variant $VQM_j$ can be associated with a tile $C_j$ of the image. The variant $VQM_j$ codes only a medium-quality version of the portion of the image situated inside the tile $C_j$. Typically, the medium-quality version has a spatial, temporal or colorimetric resolution which is not as good as that of the high-quality version but better than that of the degraded version. For example, the medium-quality version of a portion of the image situated inside a tile is displayed as a function of the distance $d_c$ which separates the center of this tile from the point of interest. By way of illustration, if the distance $d_c$ is less than a first predetermined threshold $S_1$, it is the variant $VHQ_j$ which is decrypted and decompressed to construct the image portion situated inside the tile $C_j$. If the distance $d_c$ is greater than the threshold $S_1$ and less than a predetermined threshold $S_2$, it is the variant $VQM_j$ which is decrypted and decompressed to construct the image portion situated inside the tile $C_j$. If the distance $d_c$ is greater than the threshold $S_2$, then it is the variant $VD_j$ which is decrypted and decompressed to construct the image portion situated inside the tile $C_j$. Thus, images are obtained in which the quality degrades as one gets further from the point of interest. This limits the risk of discomfort for the user.

As a variant, the key $KHQ_j$ is the same for all the tiles $C_j$ of an image. Consequently, in this embodiment, the identifier $KID_j$ associated with each variant $VHQ_j$ can be omitted.

As a variant, the variant $VD_j$ is not encrypted and only the variants $VHQ_j$ are encrypted. Thus, it is not necessary to decrypt the degraded variants in order to construct the degraded version of an image portion.

Variants of the System for Generating and Reading the Video Stream.

Numerous other embodiments of the display device 12 are possible. For example, the device 12 can be replaced with a screen and a projector which projects the images of the video stream read onto this screen. Preferably, the surface of the screen will then be a hemisphere or a sphere or a ring surrounding the user.

What has been described applies to a domains other than stereoscopic display. In these cases, the composer constructs for example a single image rather than two as described previously and the constructed image does not necessarily correspond to just a fraction of the images of the video stream that was read. In the latter case, the composer does not then need to receive the coordinates of the point 98. For example, this applies to the case where the screen surrounds the user as in the case of a spherical or hemispherical screen. This also applies to the case of a flat screen, whose dimensions are such that the user cannot have global vision of its surface.

The set 32 or the display device 12 can be integrated inside the terminal 8. This will for example be the case if the terminal 8 is a tablet or a smartphone. The set 32 can also be mechanically independent of the device 12 and of the terminal 8.

The DRM agent 50 can be implemented in a hardware form such as a security coprocessor or a processor of a chip card.

The system 2 can be produced so as to comply with standards other than those previously cited. For particular applications, neither is it compulsory that the system 2 be compatible with existing standards. For example, in one variant, the video stream is compressed image by image so that each group of images contains just a single image. In another variant, the video stream is compressed as a single block, this amounting to having a single group of images comprising all the images of the video. Finally, in another alternative, the group of images is not the smallest closed group of images.

Other Variants:

The methods described here can be implemented on all the images of the video or for just part of these images. For example, the methods described here are implemented for certain time intervals and deactivated for other time intervals. When the methods described here are deactivated, the images of the video are for example not encrypted and compressed tile-wise.

The invention claimed is:

1. A method comprising reading a video stream, wherein said video stream comprises images, each of which is paved by a union of contiguous tiles such that a portion of said image is within each of said tiles, wherein each of said tiles is defined by coordinates within said image, wherein each of said images has been compressed and encrypted on a tile-by-tile basis, wherein each tile is associated with a high-quality variant and a degraded variant, wherein said high-quality variant is a compressed and encrypted first range of bits in said video stream, wherein said degraded variant is a second range of bits that has been compressed and that is distinct from said high-quality variant, wherein only said high-quality variant codes information necessary to construct a high-quality version of that portion of said image that is within said tile, wherein only said degraded variant contains information needed to construct a degraded version of that portion of said image that is within said tile, wherein said high-quality variant, when compressed and encrypted, is capable of being decrypted and decompressed independently of compressed and encrypted high-quality variants associated with other tiles, wherein said degraded variant, when compressed, is able to be decompressed independently of compressed degraded variants associated with other tiles, wherein said degraded variant, when compressed, is able to be decompressed independently of said compressed and encrypted high-quality variant associated with the same tile, wherein said degraded variant codes enough information representative of the content of the high-quality version of that portion of said image that is within said tile with which it is associated to construct a degraded version of said image but not a high-quality version of said image, wherein reading said video stream comprises receiving said video stream, for each image in said video stream that has been compressed and encrypted on a tile-by-tile basis, acquiring coordinates of said tiles, acquiring coordinates of a point-of-interest in said image, based on said coordinates of said tiles and said coordinates of said point-of-interest, defining selected tiles and unselected tiles, wherein said selected tiles are those tiles that are closest to said point-of-interest, wherein there exists at least one unselected tile, for each selected tile, decrypting and decompressing a high-quality variant associated with said selected tile, for each unselected tile, refraining from decrypting a compressed and encrypted high-quality variant associated with said unselected tile, constructing high-quality image portions, each of which is constructed from a high-quality version of each portion of said image that is within a selected tile, constructing degraded image portions, each of which is constructed from a degraded version of each portion of said image that is within an unselected tile, wherein constructing said degraded version is carried out without taking into account said compressed and encrypted high-quality variant associated with said unselected tile, assembling said degraded image portions and said high-quality image portions to form said video stream's decrypted and decompressed image, wherein only certain portions of said decrypted and decompressed image contain said high-quality image portions, said certain portions having been selected as a function of said coordinates of said point-of-interest, for each unselected tile, decompressing said compressed degraded variant associated with said unselected tile, and constructing said degraded version of those portions of said image that are within an unselected tile based on said decompressed degraded variant associated with said unselected tile.

2. The method of claim 1, wherein acquiring coordinates of a point-of-interest comprise using a sensor to measure displacement of a user and using said measured displacement as a basis for acquiring said coordinates.

3. The method of claim 2, further comprising displaying said decrypted and decompressed images of said video stream on a screen with respect to which a position of the user is known, wherein using a sensor to measure displacement of a user comprises measuring a physical quantity that is representative of at least one physical quantity representative of a direction of said user's gaze, said method further comprising determining coordinates of an intersection between said screen and a line extending along said direction of said user's gaze, wherein said intersection defines coordinates of said point-of-interest.

4. The method of claim 1, wherein said degraded version has a first spatial-resolution and said high-quality version has a second spatial-resolution, wherein said second spatial-resolution is greater than said first spatial-resolution.

5. The method of claim 1, wherein said degraded version has a first temporal-resolution and said high-quality version has a second temporal-resolution, wherein said second temporal-resolution is greater than said first temporal-resolution.

6. The method of claim 1, wherein said degraded version has a first colorimetric-resolution and said high-quality version has a second colorimetric-resolution, wherein said second colorimetric-resolution is greater than said first colorimetric-resolution.

7. The method of claim 1, further comprising composing, based solely on said high-quality versions, a right image for a user's right eye and a left image for a user's left eye and displaying said left and right images on corresponding left and right screens of a pair of stereoscopic vision spectacles worn by a user.

8. The method of claim 1, wherein said compressed and encrypted images encode views taken in all directions contained within a cone of vision whose vertex angle is greater than 100°.

9. A method comprising generating a video stream that contains compressed and encrypted images, wherein generating said video stream comprises receiving an initial video stream that is to be compressed and encrypted, said initial video stream comprising images that are to be encrypted and compressed, for each of said images, acquiring coordinates of contiguous tiles that, when joined, pave said image, for each of said tiles, acquiring a first range of bits, said first range of bits defining a high-quality variant that alone codes information needed to construct a high-quality version of a portion of said image that is within said tile, said high-quality variant being a range of bits, compressing said high-quality variant without taking into account high-quality variants acquired for other tiles, thereby forming a compressed high-quality variant, encrypting said compressed high-quality variant, without taking into account high-quality variants acquired for other tiles associating said compressed-and-encrypted high-quality variant with said tile in said video stream in such a way as to obtain a compressed and encrypted high-quality variant that is able to be decrypted and decompressed independently of other, compressed and encrypted high-quality variants acquired for other tiles, acquiring a second range of bits, said second range of bits defining a degraded variant that is distinct from said high-quality variant, wherein only said degraded variant codes information necessary to construct a degraded version of said portion of said image that is within said tile, wherein said information necessary to construct a degraded version is insufficient to construct a corresponding high-quality version, compressing said degraded variant without taking into account high-quality or degraded variants acquired for other tiles and without taking into account said high-quality variant acquired for said tile, and encrypting said compressed degraded variant for said tile without taking into account high-quality and degraded variants acquired for other tiles and without taking into account said high-quality variant acquired for said tile.

10. The method of claim 9, wherein said compressed and encrypted images encode views taken in all directions contained within a cone of vision whose vertex angle is greater than 100°.

11. A non-transitory computer-readable medium having encoded thereon instructions for causing an apparatus comprising an electronic reader to carry out the method recited in claim 1.

12. An apparatus comprising an electronic reader configured to read a video stream containing compressed and encrypted images, said reader comprising a programmable microprocessor that is configured to carry out the method recited in claim 1.

13. An apparatus comprising a generator of a video stream containing compressed and encrypted images, said generator comprising a programmable microprocessor that is configured to carry out the method recited in claim 9.

* * * * *